US010031829B2

(12) United States Patent
Luchi et al.

(10) Patent No.: US 10,031,829 B2
(45) Date of Patent: **\*Jul. 24, 2018**

(54) METHOD AND SYSTEM FOR IT RESOURCES PERFORMANCE ANALYSIS

(75) Inventors: Duccio Luchi, Rome (IT); Dario Mella, Rome (IT); Stefano Zampieri, Feltham (GB)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/895,832

(22) Filed: Sep. 30, 2010

(65) Prior Publication Data

US 2011/0078106 A1  Mar. 31, 2011

(30) Foreign Application Priority Data

Sep. 30, 2009 (EP) .................... 09171727

(51) Int. Cl.
*G06N 99/00* (2010.01)
*G06F 11/34* (2006.01)

(52) U.S. Cl.
CPC ...... *G06F 11/3452* (2013.01); *G06F 11/3409* (2013.01); *G06F 11/3442* (2013.01); *G06F 11/3476* (2013.01); *G06N 99/005* (2013.01)

(58) Field of Classification Search
CPC .................................................. G06N 99/005
USPC ......................................................... 706/48
See application file for complete search history.

(56) References Cited

U.S. PATENT DOCUMENTS

| | | | | |
|---|---|---|---|---|
| 4,849,879 A | * | 7/1989 | Chinnaswamy et al. | 706/45 |
| 4,890,227 A | * | 12/1989 | Watanabe et al. | 706/14 |
| 6,006,016 A | * | 12/1999 | Faigon et al. | 714/48 |
| 6,078,924 A | | 6/2000 | Ainsbury et al. | |
| 6,522,768 B1 | * | 2/2003 | Dekhil et al. | 382/100 |
| 6,757,850 B1 | * | 6/2004 | Lehner | 714/48 |
| 2005/0278703 A1 | | 12/2005 | Lo et al. | |
| 2006/0020924 A1 | * | 1/2006 | Lo | G06F 11/0709 717/127 |
| 2006/0053422 A1 | * | 3/2006 | Alikacem et al. | 718/100 |
| 2006/0161884 A1 | * | 7/2006 | Lubrecht et al. | 717/104 |
| 2007/0185990 A1 | * | 8/2007 | Ono et al. | 709/224 |
| 2007/0250829 A1 | * | 10/2007 | Hillier et al. | 717/170 |
| 2008/0307269 A1 | * | 12/2008 | Bennett et al. | 714/47 |

OTHER PUBLICATIONS

Wikipedia Page for Anti-pattern, retrieved Jun. 8, 2017, https://en.wikipedia.org/wiki/Anti-pattern.*
Parsons, et al., "Detecting Performance Antipatterns in Component Based Enterprise Systems," Journal of Object Technology, vol. 7, No. 3, Mar. 2008.

* cited by examiner

*Primary Examiner* — Vincent Gonzales
(74) *Attorney, Agent, or Firm* — Steven M. Greenberg, Esq.; CRGO Law

(57) ABSTRACT

There is disclosed a method of monitoring an infrastructure comprising managed units, the method comprising the steps of: acquiring data associated with a first performance indicator from a first managed unit; determining a first quantized distribution function of at least a subset of pieces of data of the acquired data of the first managed unit; determining if the first quantized distribution function verifies one or a plurality of predefined rules describing particular distribution functions of performance indicators.

11 Claims, 7 Drawing Sheets

Prior art

METHOD AND SYSTEM FOR IT RESOURCES PERFORMANCE ANALYSIS

CROSS-REFERENCE TO RELATED APPLICATIONS

This application claims priority under 35 U.S.C. § 119(a) to European Patent Application Serial Number 09171727.2, filed Sep. 30, 2009, entitled "METHOD AND SYSTEM FOR IT RESOURCES PERFORMANCE ANALYSIS", the entirety of which is incorporated herein by reference.

FIELD OF THE INVENTION

The present invention relates generally to data processing, and more particularly to systems and methods for computer performance analysis.

BACKGROUND ART

IT service providers need to carefully monitor performance and trends of the IT environment, to maintain its utilization under control. These organizations are facing technical challenges to perform properly the two key IT management processes: problem management and service measurement.

In some situations there are problems on a specific application with clear root causes that need an analysis on a limited number of IT infrastructure components (for example servers or subsystems). In other situations, recurring service outages occur with no evident root cause. This causes service unavailability or performance degradation. Nowadays, larger and larger IT resources are built and exploited, as in cloud computing infrastructures. Massive IT infrastructure components analysis or preventive health status monitoring need a different approach. IT service providers need to perform complex analyses and try to answer to the following questions:

are all the servers/middlewares performing well?

is there any servers/middlewares that is not performing as it should be?

is there any hidden problem that might become serious, if the IT volumes increase?

A few patents provide approaches aiming at monitoring performances of IT resources; for example:

U.S. Pat. No. 6,522,768 entitled "PREDICTING SYSTEM BEHAVIOR OF A MANAGED SYSTEM USING PATTERN RECOGNITION TECHNIQUES" discloses a system for predicting system behaviour of a managed system which includes a measurement module coupled to the managed system to generate measurement data of the managed system. The measurement data include current measurement data and past measurement data. The past measurement data indicate a problem of the managed system. A pattern classification module is coupled to the measurement module to process the past measurement data into a plurality of representative pattern images, and to select a predictor pattern image that best identifies the problem from the pattern images. A pattern matching module is coupled to the pattern classification module and the measurement module to process the current measurement data into a plurality of pattern images using the same image processing technique that generates the predictor pattern image. The pattern matching module also identifies any pattern image that matches the predictor pattern image to predict the problem. A system for generating a predictor pattern image for predicting system behaviour of a managed system is also described.

This approach is a predictive system, while the need remains to discover existing performance problems. The proposed algorithm of this approach is based on images analysis (pixel) "Gradient analysis, texture representation, sharpening edge detection" which presents many drawbacks. What is more, a time sliding windows is required, to analyse evolution over time. The approach uses image compression techniques which are not convenient (computational power is required, artificial bias, etc).

United States Patent Application Publication Number 20060020924 entitled "SYSTEM AND METHOD FOR MONITORING PERFORMANCE OF GROUPINGS OF NETWORK INFRASTRUCTURE AND APPLICATIONS USING STATISTICAL ANALYSIS" discloses a system, method and computer program product for monitoring performance of groupings of network infrastructure and applications using statistical analysis. Said method, system and computer program monitor managed unit groupings of executing software applications and execution infrastructure to detect deviations in performance. Logic acquires time-series data from at least one managed unit grouping of executing software applications and execution infrastructure. Other logic derives a statistical description of expected behaviour from an initial set of acquired data. Logic derives a statistical description of operating behaviour from acquired data corresponding to a defined moving window of time slots. A logic compares the statistical description of expected behaviour with the statistical description of operating behaviour; and a logic reports predictive triggers, said logic to report being responsive to said logic to compare and said logic to report identifying instances where the statistical description of operating behaviour deviates from statistical description of operating behaviour to indicates a statistically significant probability that an operating anomaly exists within the at least managed unit grouping corresponding to the acquired time-series data.

This approach is a real time monitoring system to detect deviations from an historical trend, while the need remains for a discovery of existing performance problem using collected data.

The considered approach uses "an expected normative behavioural pattern", called footprint, and calculates the deviation between monitored data and the footprint of the system monitored. This comparison with well-performing systems is not satisfactory. As the first approach, the proposed method uses a time sliding windows (evolution over time) with sample data collected at regular time intervals. The considered algorithm measures the "angle of the subspaces" to calculate the differences between the data stream and the footprint; this approach also presents drawbacks.

There is a need for a method enabling to discover existing performance problems of IT resources.

SUMMARY OF THE INVENTION

In order to address these and other problems, there is provided a method of monitoring an infrastructure comprising a plurality of managed units according to the appended independent claim 1, and a computer program, a computer readable medium and a system according to appended claims 8, 9 and 10 respectively. Preferred embodiments are defined in the appended dependent claims.

It is an object of the invention to focus and take advantage of known "bad-performing" systems. Said "bad-performing" systems can be so defined because of presenting one or a plurality of performance indicators (or a combination thereof) associated with values which are measured above, equal or under certain predefined thresholds.

Embodiments of the invention improve the capability of an IT service provider to answer questions about IT resources. Given a set of IT infrastructure components (for example servers or middleware instances), embodiments of the invention relate to a method for quickly identifying the components which are the most likely to have problems.

Embodiments of the invention allows people with little knowledge of the IT environment being analyzed, and even without deep performance/tuning skills, to perform an initial ranking of the IT infrastructure components. These components are further analysed and a preliminary problem diagnosis may be conducted. For example, the present method can be implemented in a server farm analysis comprising several hundred servers. Embodiments of the invention does not relate to real-time monitoring systems which are focused on alerting an operator when a pre-determined performance threshold has been exceeded. Embodiments of the invention use the analysis of historical data of many systems to determine the likelihood that a system has performance problems and to create a scorecard to highlight those that deserve a deeper analysis.

Embodiments of the invention leverage random samples collection. Most of approaches of the prior art make assumptions that the distribution of the values is a multivariate normal distribution; embodiments of the invention do not make such hypothesis but study how the data is distributed, in order to discover performance problems.

Embodiments of the invention enable to find performance problems that cannot be discovered with other known approaches. For example, studying a system which never goes over 95% CPU: this indicates either a bottleneck or an oversized server. Prior approaches analyze data using mean and variance values and assume a "multivariate normal distribution". This kind of rounding makes impossible to determine if the CPU never reached 95%. Instead of analysing how different performance indicators may correlate together, embodiments of the invention search (multiple) anti-patterns only on a single performance indicator at time.

Embodiments of the invention cope with a wide range of problems such as hardware failure or poor capacity planning. Other embodiments of the invention fill a gap in the resource monitoring technology and capacity planning. According to embodiments of the invention, there is no need to build a model of the run-time application across multiple servers: each single server is considered as a unique identity.

Unlike software design and deployment antipattern techniques, embodiments of the invention require collecting less information and requiring less computational power both at runtime and at analysis time. It is less invasive on the middleware/application runtime. Embodiments of the invention can be applied to every platform/middleware application (such as databases, infrastructure servers, etc).

Embodiments of the invention leverage:

the analysis of the distribution function (which correspond to an advanced statistic approach) and not to the simple analysis of a simple trend over the time;

the study the good operational behaviour of an IT object (a server for example) trough the comparison of the associated performance indicators (anti-patterns) with the performance indicators' distribution function;

a sampling methodology based on random;

the introduction of "Observational Class" concept and the association of performance indicators (performance indicator) with a "Observational Statistic Class";

the use of said "Observational Class" to calculate meaningful quantized distribution function that can be handled easily with a relational database and computer programs;

a reduction algorithm which supports advanced statistic analysis;

IT objects quick ranking based on anti-patterns analysis (though the constitution of a scorecard).

It is an object of the invention to analyze data automatically in order to build a ranking of the IT objects that are most likely to have a problem; in this way a detailed and specific investigation by skilled people, is required only on a small subset of the IT resources: those that are in the first positions of the ranking.

Embodiments of the invention complement human performance analysis of systems: the proposed methods and systems produce a ranking of the systems that are likely to have a problem; system administrators can handle further detailed analysis on identified systems.

Among other advantages, embodiments of the invention allow to identify problems related to abnormal basic statistic functions. It isn't required a previous knowledge and understanding of the environment being analyzed. Embodiments of the invention are well suited to analyze a huge amount of systems by quickly highlighting those that are likely to have problems. Embodiments of the invention allow identifying problems related to a specific particular abnormal distribution of a performance indicator. Embodiments of the invention enable to reduce the data to be analyzed, in a way computationally efficient. Embodiments of the invention can aggregate reduced data and perform the analysis on this subset. Embodiments of the invention handle time parameter implicitly in the analysis methodology.

According to some embodiments of the invention, reducing the data to be analyzed increases the computational efficiency of the "antipattern" discovery.

Further advantages of the invention will become clear to the skilled person upon examination of the drawings and detailed description. It is intended that any additional advantages be incorporated therein.

BRIEF DESCRIPTION OF THE DRAWINGS

Embodiments of the invention will now be described with reference to the following drawings, in which.

DETAILED DESCRIPTION

Figure 1A:
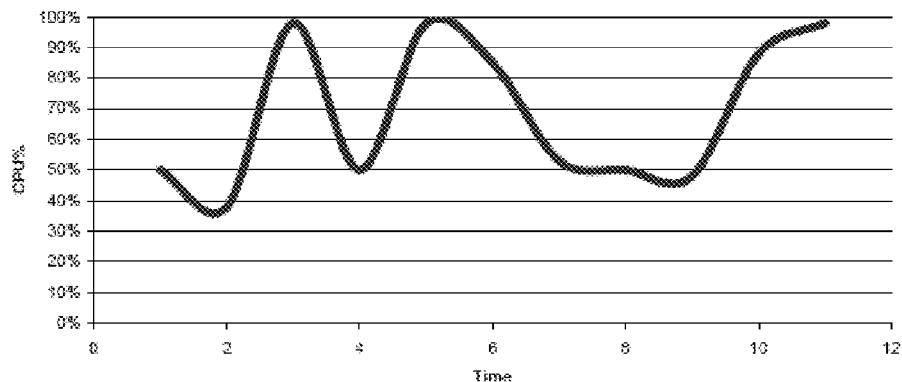
FIGS. 1A through 1C, taken together, illustrate approaches of the prior art.

To facilitate description, any numeral identifying an element in one figure will represent the same element in any other figure.

The following text presents embodiments in the context of computer performance analysis but it is to be understood that it is not limited to this specific context or type of hardware; it extends equally to any type of IT resources or objects. It provides useful teachings to domains such as data center management or cloud computing resources (utility computing).

FIG. 1 illustrates approaches of the prior art.

In the technical domain of the monitoring and the analysis of IT systems, the following types of alternative approaches are to be found:

Type 1: the most simple approach is to analyze and get a human review of a given performance indicator (performance indicator in short) over time. These performance indicators are usually plotted on a graph for further analysis or compared to thresholds. This is mostly achieved on a case by case basis.

Type 2: when the amount of data is huge, trying to understand the behaviour of a performance indicator over the time, the volume of data can be reduced by using statistical functions like average, maximum and minimum values. In this case, the analysis is typically performed by comparing the reduced data to thresholds being previously determined by best practices.

Type 3: data is reduced with the usage of additional statistical indicators (like the variance) and it is looked for correlations between several performance indicators of a system. These approaches are characterized by the usage of multi valued indicators or vectors or matrixes of indicators.

The methods of type 1) provide a huge amount of information that may not be meaningful and whose analysis can be very time consuming. Anyone used to analyze graphs representing the trend of performance indicator over the time (traces), knows that the graphs are functions with a lot of variations and relative minimums and maximums which may or may not be classified as normal behaviour: the decision is left to the judgement and experience of those who analyze the data. This approach based on experience is difficult and time consuming: this is why it can be selectively applied only to few objects and performance indicator When coping with hundreds of objects, it is very difficult to use this approach to discover operational anomalies. Approaches of type 1 require manual reviews and experience of the examiner.

The methods of type 2) take a time interval (for example 1 hour or 1 day) and provide few summarized data using statistical functions like Average( ), Max( ) and Min( ). However the "Basic Statistical" summarization often looses important information thus making the Average( ), Max( ) and Min( ) value meaningless for a successful problem analysis and capacity planning. This can be better explained with an example on the "Processor utilization percentage" performance indicator: in any situation (critical or not) the Max is likely to be 100% and the Min below 10% because it is likely that, during the period, the CPU has reached the 100% or has fallen below 10% at least once. The Average could be for example 35% but this doesn't tell us if it was a constant 35% or if the system has suffered being at 100% for 3 hours and being idle during the rest of the time. Many commercial performance tools provide means to define thresholds to trigger alarms when some statistical function is exceeded over time. However the thresholds are compared against statistical functions values that have lost important information on the behaviour of the performance indicator. The consequence of this is that either "false positive" are generated or that anomalies are missed.

The methods of type 3) have the advantage towards the methods of type 2) that, still using reduced data, the behaviour of a performance indicator can be better described. With these methods, the statistic reduction of the input data is well suited to highlight the changes of the behaviour of a system over time or the changes against a behavioural model of correlated performance indicators. Many methods compare the behaviour of given systems with a "good" behaviour footprint or reference to discover a fault. Good footprints are many (potentially infinite) while there are few "bad" behaviours (which are presently described as statistical "anti" patterns for a specific performance indicator). Type 3 approaches present other drawbacks. The first one is that using assumptions on the distribution of the values, a number of specific behaviours cannot be discovered. For example, assuming a normal (Gaussian) distribution of the values, it is not possible to identify situations where there are two or more accumulations points of a performance indicator.

Reference is now made to FIG. 1a.

Considering an example wherein are indicated CPU Percentage usage with the sequence over time 50%; 38%; 98%; 50%; 98%; 85%, 53, 50%; 48%; 88%; 98%. This string generates the curve shown in the FIG. 1a. This curve has two accumulation points (or "modes" in mathematical terms): one in 50% and one on 98%.

Figure 1B:
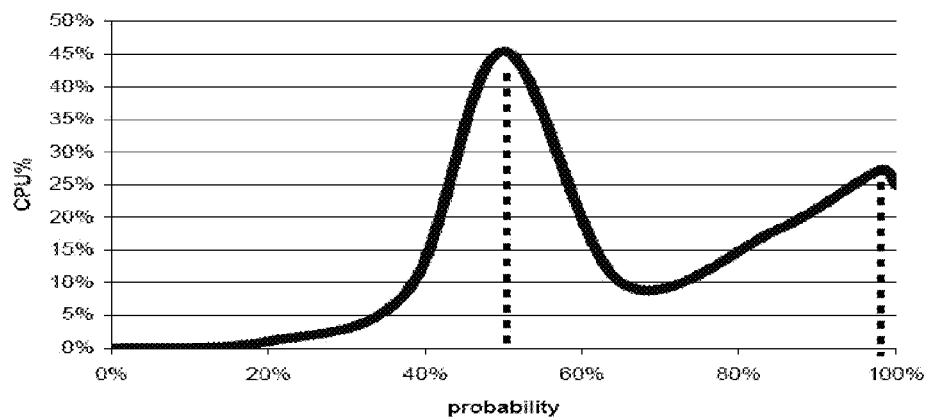
Figure 1C:
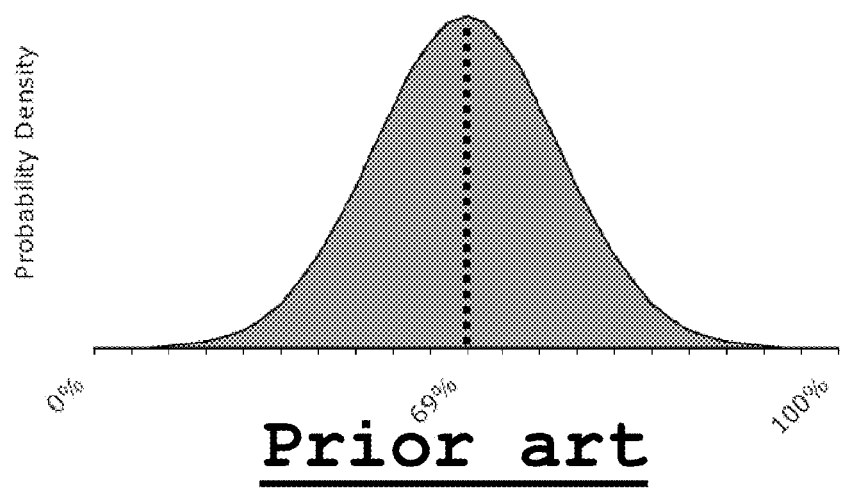

Plotting the frequency distribution of the CPU % values, the FIG. 1b is obtained.

FIG. 1b curve provides an example; it indeed represents a graph of a dual-core processor (comprising two cores) wherein a first one is bound to a process in loop while the second one is loaded with business workload. If it had been assumed a normal Gauss distribution or any other unimodal distribution, this would have resulted in the FIG. 1c wherein the CPU loop problem could not be discovered.

The second drawback is that such reduced data cannot be combined together to analyze subsets of reduced data. The importance of proper data reduction can be shown with the help of an example:

Considering for example the Processor utilization % performance indicator and supposing that a sample is collected every minute for one year: if being interested in the average value of the Processor utilization % of a specific month, it is possible to either:

store every sample in a database which may contain hundreds of thousands of samples and calculate the average over 60 mins×24 hours×30 days=43200 samples of the considered month; or:

store in a database the daily average of the Processor utilization % (only a few hundreds records) and calculate the average of the averages (which is still the average) of the 30 samples representing the considered month.

The former approach has the drawback that the memorization strategy needs a big database and requires many computational resources for each request on the database. The later approach is more efficient but it works only for some types of statistical counters like for example average, max, min (average equals to the average of averages, max is equal to max of maxs, . . . ). The main drawback is that not all the statistical counters have the following linear property:

f(t1, . . . , tn)=f(f(t1, . . . , ti), f(ti+1, . . . , tn))
where ( )t1, . . . , tn is a sampling.

This problem is made clear with the following example: there are anti-patterns (typically related to memory heaps) shown by a high in the dispersion of the performance indicator around an average. The distance of the performance indicator from the antipattern can be calculated by using the standard deviation σ that doesn't have the aforementioned linear property (the standard deviation is not the deviation of the deviations).

Figure 2:
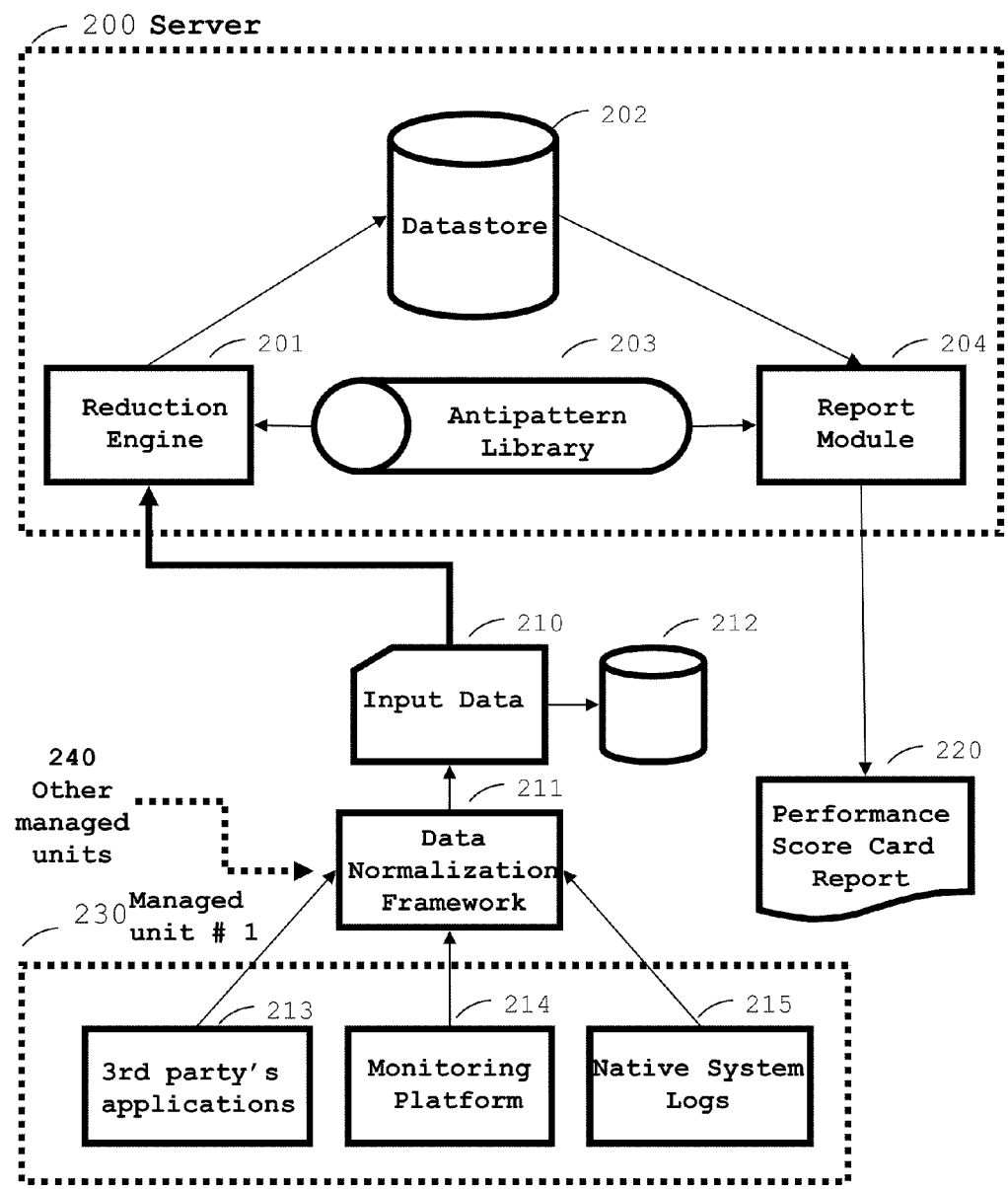
FIG. 2 shows the overall architecture of the invention.

FIG. 2 shows the overall architecture of the invention.

The FIG. 2 shows a system view. The figure comprises a server 200, a reduction engine 201, a datastore 202, a antipattern library 203, a report module 204, input data 210, a data normalization framework 211, a database 212, a representation of third party's applications 213, a monitoring platform 214 and native system logs 215; a performance score card report 220, a managed unit 230 and other managed units 240.

The FIG. 2 shows the acquisition of the data of the managed unit 230. It is to be understood that data of other managed units 240 of the infrastructure (IT components, resources, etc) is also collected (for each managed unit, performance data is collected); for the sake of clarity, the handling of data of the managed unit 230 is solely illustrated.

The server 200 processes the input data 210 of the managed unit 230. Said input data 210 is provided either in flat file format or as relational database format. The data normalization framework 211 provides the input data 210, which is stored in the database 212. Said normalization framework 211 aggregates and normalizes in a common or standardized format data acquired from third party's applications 213 and/or from the (local) monitoring platform 214 and/or from logs of the local system 215. It is observed that there may be other optional sources of data. Said data is such as: SNMP data, transactional response values, trapped data, traces, custom or other logged data that describe the performance behaviour of the managed Unit. Input data comprises the value of the performance indicator being measured, a timestamp and a label to identify the performance indicator. Input data can be collected by several means as shown on FIG. 2 (third party's applications 213 and/or from the (local) monitoring platform 214 and/or from logs of the local system 215).

An API in the reduction engine 201 reads the data. Said reduction engine 201 processes the input data 210 by grouping pieces of data accordingly to predetermined rules; the datastore 202 stores the reduced data; the antipattern library 203 comprises one or a plurality of antipattern; an antipattern is a particular distribution of values of one (or more) performance indicators, which particular distributions can be typically found in systems that are not performing well. These antipatterns are defined in terms of rules applied to the distribution function of one or more performance indicator. In other words, at a first level, there is the performance indicator; at a second level there is the distribution function of the performance indicator; at a third level there is the antipattern, i.e. the rule verified by (or applied on) the distribution function (for example "No samples in the interval 0-5" or "Less than 5% samples in the interval 90-100"). An antipattern thus corresponds to a class (set, collection, series, body, group, etc) of particular distribution functions.

Antipatterns are stored in the antipattern library 203. Said antipattern library 203 comprises, for each antipattern, a set of rules and the quantization reduction criteria; the report module 204 compares the reduced data against the antipatterns of the Antipatterns library 203 in order to produce a Scorecard report 220. This performance scorecard report is a report in a tabular form.

This report helps system administrators to manage IT resources. For each managed unit, the performance scorecard report indicates the set of antipatterns discovered for that managed unit. A managed unit is a logical grouping of software and infrastructure components. There is provided a score of each antipattern that indicates how much that antipattern applies to the associated managed unit.

The present method thus analyses the (probability) distribution of a performance indicator: in other words, given a performance indicator (for example the CPU utilization in %) the distribution function is calculated in discrete intervals and said obtained distribution is compared against the distribution functions of anti-patterns (where an anti-pattern is the typical behaviour of a system that is not performing well). Anti-patterns are considered rather than well behaved-performance patterns because "good" patterns are numerous, while "anti-patterns" are relatively few. In this way it's easier to compare the distribution function against a set of limited anti-patterns.

The method comprises the steps of:

reducing the amount of input data and storing the reduced data into a datastore;

comparing the reduced data against a set of predetermined anti-patterns to detect software and infrastructure components (Managed Units) abnormal behaviours;

producing a ranking of managed units presenting performance problems.

The reduction of data is now discussed. To reduce the amount of input data, these can be samples of the performance indicator. In a preferred embodiment, a random sampling is used. It is also recommended to have enough of samples to represent the full population. For this purpose, it is suggested to use the observation of H. Sturges which defines the optimal numbers of intervals C based on the sampling number N. The formula is:

$$C = 1 + 10/3 \; \log_{10}(N)$$

Supposing C=8 intervals (found to be empirically the typical and useful numbers for each performance indicators), the optimal number of sampling N is about 125.

Following, 150 is an efficient number to group the sampling in an hour. With the reduction of said data, the quantity of data can be reduced to:

[Min, Max, $r_1, \ldots, r_s, \Sigma s^2$]

This array counts 11 values. The reduction factor is superior to ten, which is considerable. What is more, if having homogeneous workloads, it is not required to have one hour time frame and the required acquired data can be further reduced (for example two hours for 150 samplings).

Figure 3:
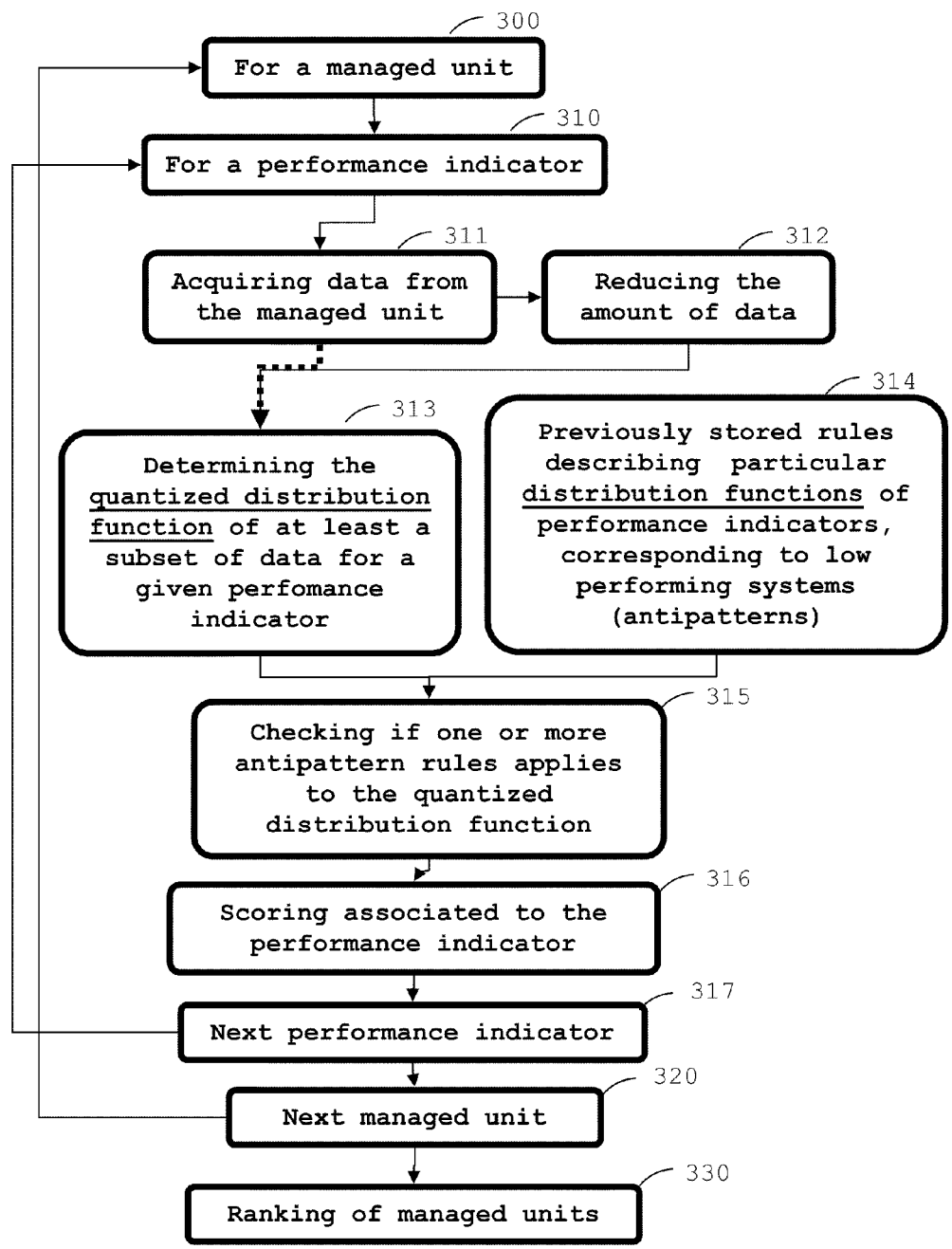
FIG. 3 illustrates the method according to some embodiments.

FIG. 3 illustrates an exemplary embodiment of the method.

The figure shows different steps. For a managed unit at step 300 it is defined a unit to be managed which is part of the monitored infrastructure, for a performance indicator; at step 310, it is defined a first performance indicator; it is then acquired data from the managed unit at step 311.

An optional step of reducing data is provided at step 312, which is the aggregation of different quantized function of the same performance indicators of the same managed unit to obtain a unique quantized function.

A quantized distribution function of the performance indicator is then calculated at step 313. In the same step, considering the acquired data, associated to a given performance indicator, several statistical descriptors are computed (such as min, max, average and sums of the squares of data); said descriptors operating on acquired data of step 311 or reduced datasets of step 312. This quantized distribution is thus calculated on at least a subset of acquired data.

Previously stored is a set of rules describing malfunctioning or non functioning systems (the antipatterns); this is shown at step 314. These rules are accumulated by experience (best or worse practices; systems being designated as performing not satisfactorily, under one or a plurality of predefined or predetermined thresholds) or are automatically inferred (eventually in real-time).

At step 315, the calculated quantized distribution function is taken into consideration. The function is analyzed. It is determinated if one or a plurality or rules can be verified given the calculated quantized distribution function, the previously stored rules are checked against the quantized distribution function of the performance indicator of the considered managed unit. This determines if one or more "antipatterns" can be detected. For example, antipattern rules may be "No samples in the interval 0-5" or "Less than 5% samples in the interval 90-100". One or a plurality of rules can be verified simultaneously. For example, the two rules quoted above can be verified simultaneously by the same quantized distribution function.

As an alternative, the above comparison or verification step may be performed by aggregating more quantile distribution function of the same performance indicator fo the same managed unit. As an alternative, improvements may be added at this step, for simplifying the quantized distribution function (mobile mean, averaging function to smooth curves, normalization, etc).

At step 316, a score associated to the comparison or verification of step 315 is issued for the performance indicator. This scoring step may use a variety of means (different weighs, priorities, class, etc).

If there is another performance indicator to be monitored, the method returns to step 310 with another performance indicator.

If there is no other performance indicator to monitor, the method returns to step 300 and another managed unit is analyzed, until the different (available) managed units have all been analyzed. When all (available) managed units have been monitored, the different scores associated to the different performance indicators of the different managed units are sorted out, optionally ponderated by predetermined weighs (inputs of system administrators or machine learning based, etc). A ranking of managed units which are likely to present a malfunction are presented for further human analysis.

An optional step may consist in identifying available managed units and/or a selection of managed units to be monitored (not all managed units may be worth to analyze). It is further observed that a "bad-performing" managed unit can be differentiated from a "good-performing unit" thanks to the appraisal of one or a plurality of performance indicators (or a combination thereof). For example, it will be assessed if the values associated with this or these performance indicators are measured above, equal or under certain predefined thresholds. Corresponding managed units may then serve as reference managed units (or not).

Figure 4:
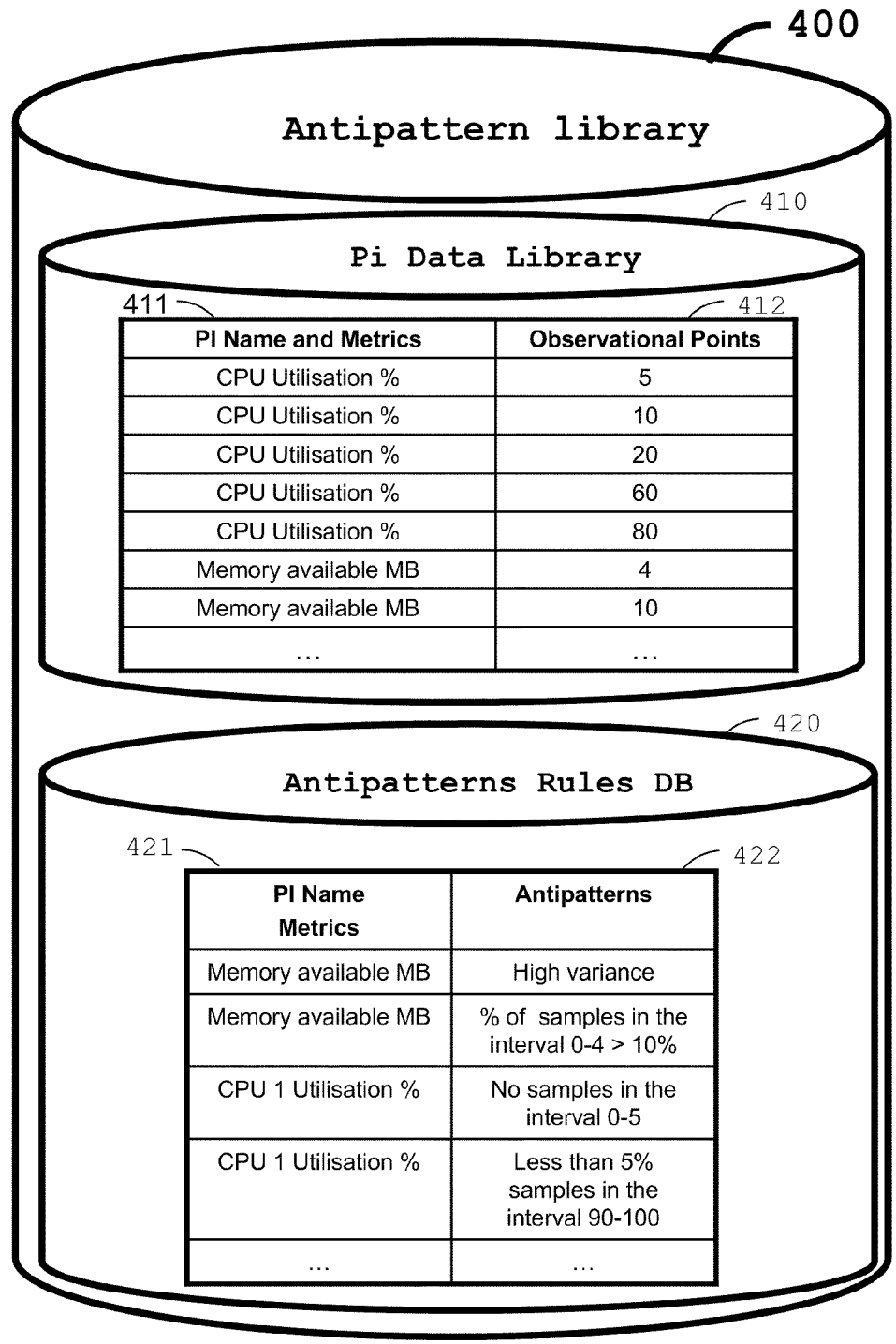
FIG. 4 illustrates the antipattern library.

FIG. 4 illustrates the Antipattern library.

The FIG. 4 shows an antipattern library 400 including a performance indicator data library 410 and an antipattern rules database 420.

The performance indicator data library 410 comprises a table with at least two types of inputs/columns: the performance indicator name or label 411 (such as the memory available in Mb or the CPU utilization in %) and the number of observational points 412 (quantization points). The antipattern rules database 420 comprises at least two columns: the performance indicator name or label 421 (such as the memory available in Mb or the CPU utilization in %) and the associated antipattern rule 422.

The antipattern library 400 is implemented as a database containing two sets of data: the performance indicator data library 410 and the antipattern rules database 420 shown on FIG. 4. The performance indicator data library 410 comprises the observational points 412 or quantization points (that determine the quantization intervals) to create a meaningful quantized distribution function of the performance indicator. For each of the previous performance indicator, it is defined a Standard Observational Statistic Class (SOSC) which can be intuitively defined as the range of interest for understanding the behaviour of the performance indicator. In a more formal definition the observational class is a set of ascending ordered non negative real points.

If $r_1, \ldots r_m$ are non negative real points $[0, r_1), \ldots [r_{i-1}, r_i), \ldots [r_m, +\infty)$ is the associated observational statistic class. If the performance indicator is a percentage, the range can be restricted to the range to [0,1] and the definition be adapted consequently.

Below stands a table which shows examples of samples of the observational Classes for some performance indicators.

| p.i. name | Observational Interval | Collection Period | Metric |
| --- | --- | --- | --- |
| Memory\\Available | (4), (10), (50), (100) | 60 minutes | Megabyte |
| Memory\\Pages Read/sec | (10), (20), (40), (60), (80) | 60 minutes | Events |
| Processor utilization - Processor(_Total)\% Processor Time | (0.05), (0.1), (0.2), (0.3), (0.6), (0.7), (0.8), (0.9) | 60 minutes | % |
| Physical Disk(n)\Avg. Disk secs/Transfer | 1, 4, 8, 10, 15, 20, 25 | 60 minutes | Milli seconds |
| Time spent waiting for IO | (0.05), (0.1), (0.15), (0.25), (0.40) | 60 minutes | % |

In other words, values which correspond to a given performance indicator are grouped together. The purpose of this operation is to transform a continuous function in a discrete function with fewer values to store. For example, considering the CPU (processor) utilization from the previous table: rather than storing the distribution function value for 100 values (0%, 1%, 2%, ... 99%), the number of occurrences of the performance indicator being between 0 and 5% are counted, so as the number of occurrence between 5% and 10%, the number of occurrences between 10% and 20%, etc. In this way, only 8 values are stored.

The Antipatterns rules database 420 contains the definition of the Antipatterns in form of rules which discover and weigh the antipatterns related to a given managed unit. The rules can be written in Prolog, JESS, or other programming languages, rule based or not.

Examples are provided in the table below:

| | |
| --- | --- |
| p.i. name | Memory\\Available |
| Purpose | Show if free fiscal memory is available for computational needs. |
| Antipattern description | Distribution accumulated near the threshold of 4 MB |
| p.i. name | Memory\\Available |

-continued

| | |
|---|---|
| Purpose | Show if free fiscal memory is available for computational needs. |
| Antipattern description | High dispersion of the distribution function variance Standard Deviation/Average >0.3 |
| p.i. name | Memory\\Pages Read/sec |
| Purpose | Shows if paging phenomena occurs. |
| Antipattern description | Distribution accumulated near the threshold of 10 Pages Input/sec |
| p.i. name | Processor utilization - Processor(_Total)\% Processor Time |
| Purpose | Shows the load status of the processors. |
| Antipattern description | Distribution accumulated over the threshold of. <80% |
| p.i. name | Processor utilization - Processor(_Total)\% Processor Time |
| Purpose | Shows the load status of the processors. |
| Antipattern description | p.i. distribution with no values under 10% |
| p.i. name | Processor utilization - Processor(_Total)\% Processor Time |
| Purpose | Shows the load status of the processors. |
| Antipattern description | p.i. values over 90% are less than 5% |
| p.i. name | Physical Disk(n)\Avg. Disk secs/Transfer |
| Purpose | Checks the disk access time is good |
| Anti-pattern | Distribution accumulated over the threshold of 15 ms |
| p.i. name | Time spent waiting for IO |
| Purpose | Show problems of cpu wait I/O. |
| Anti-pattern | Distribution accumulated over the threshold 15% |

Accumulation means that 10% of the samples are in the interval over the threshold.

Figure 5:
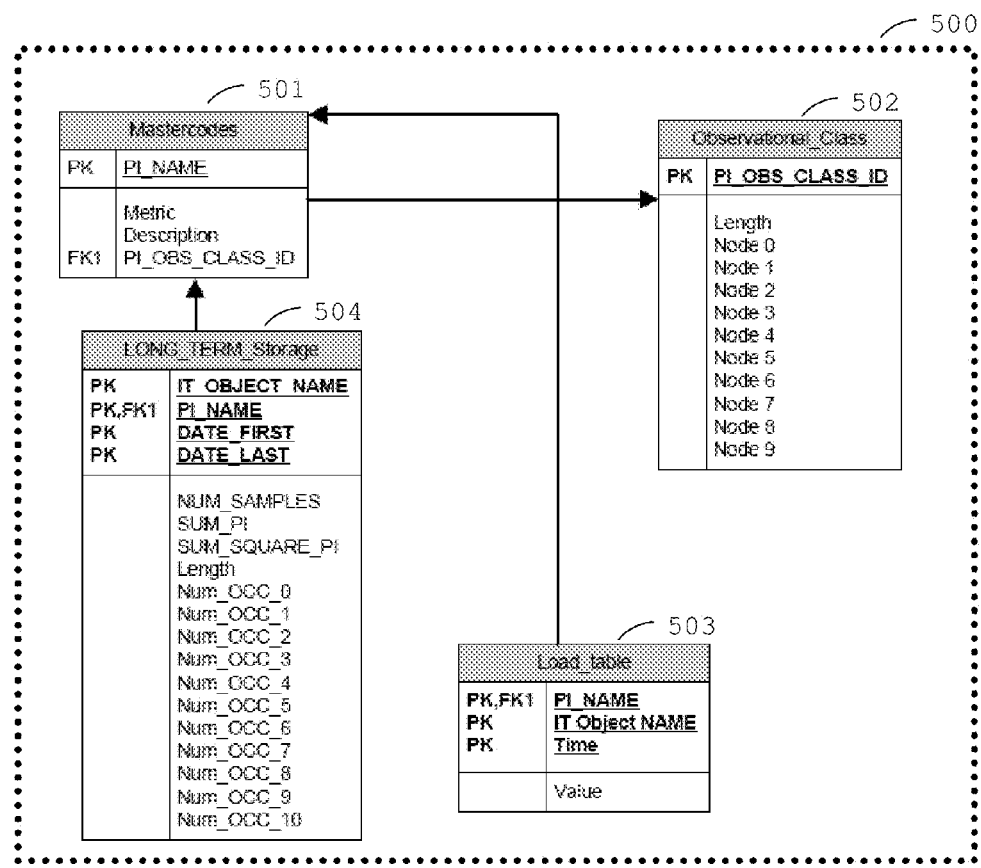
FIG. 5 illustrates the datastore.

FIG. 5 illustrates the datastore.

The datastore provides storage for processed input data. In a preferred embodiment; the storage format is in a relational database form, but alternatively other data structure can be chosen. The FIG. 5 shows an example of a relational database, used to implement the proposed method. The FIG. 5 comprises an example of a relational database 500, comprising a mastercode table 501, an observational class table 502, a load table 503, and a long term storage table 504.

Corresponding to the columns of said tables, a description stands in the table below:

| Colum Name | Description |
|---|---|
| PI_NAME | Is the name of the PI |
| Metric | Is the type of the PI i.e. (MB, events, Percentage etc) |
| NUM_Samples | Is the number of samples summarized in the record |
| IT_OBJECT_NAME | Is the name of the instance or server whose p.i. belongs |
| Node i (i=0,...,9) | Is $i_{th}$ upper bound value of the Observational Class of |
| Length | Is the length of the associated array (we suppose max length equal to 10) |
| SUM_PI | Is the sum of samples summarized in the record |
| SUM_SQUARE_PI | Is the squares sum of samples summarized in the record |
| Date_FIRST | Is the date and Time of the first sample included in the record |
| Date_LATE | Is the date and Time of the Last sample included in the record |
| NUM_OCC_i (i=0,...,10) | Is the number of the sample occurrences fallen in the $i_{th}$ Interval |
| PI_OBJ_CLASS_ID | Is the identifier to pick up the right Observational Class |

Figure 6:
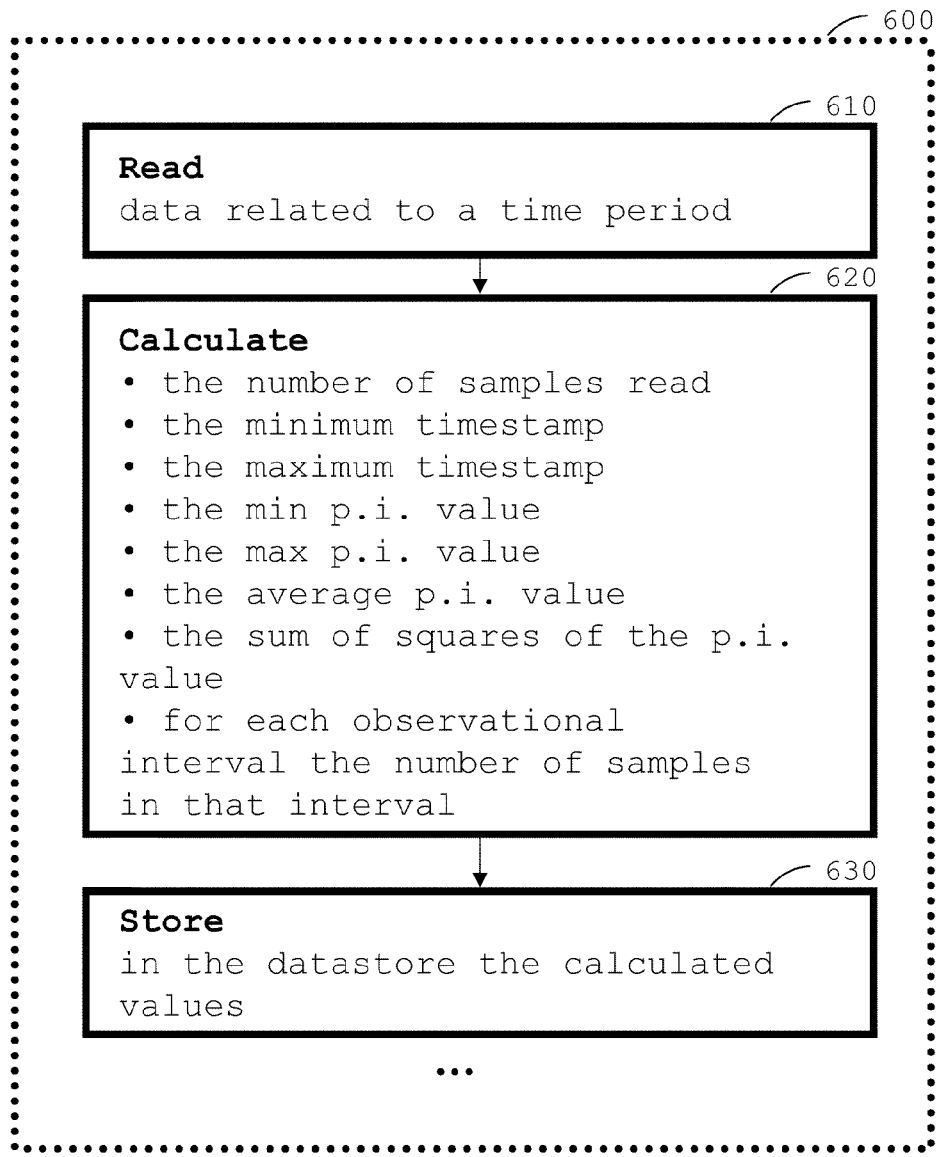
FIG. 6 illustrates the reduction engine.

FIG. 6 illustrates the reduction engine.

The reduction engine 600 provides the data reduction functionality to the system. The FIG. 6 shows a data reduction engine 600, which comprises some details of implemented steps: the process is broken into the following primary steps: a reading step 610, a calculation step 620 and a storing step 630. The reduction engine may comprise other refinement steps (not shown).

Figure 7:
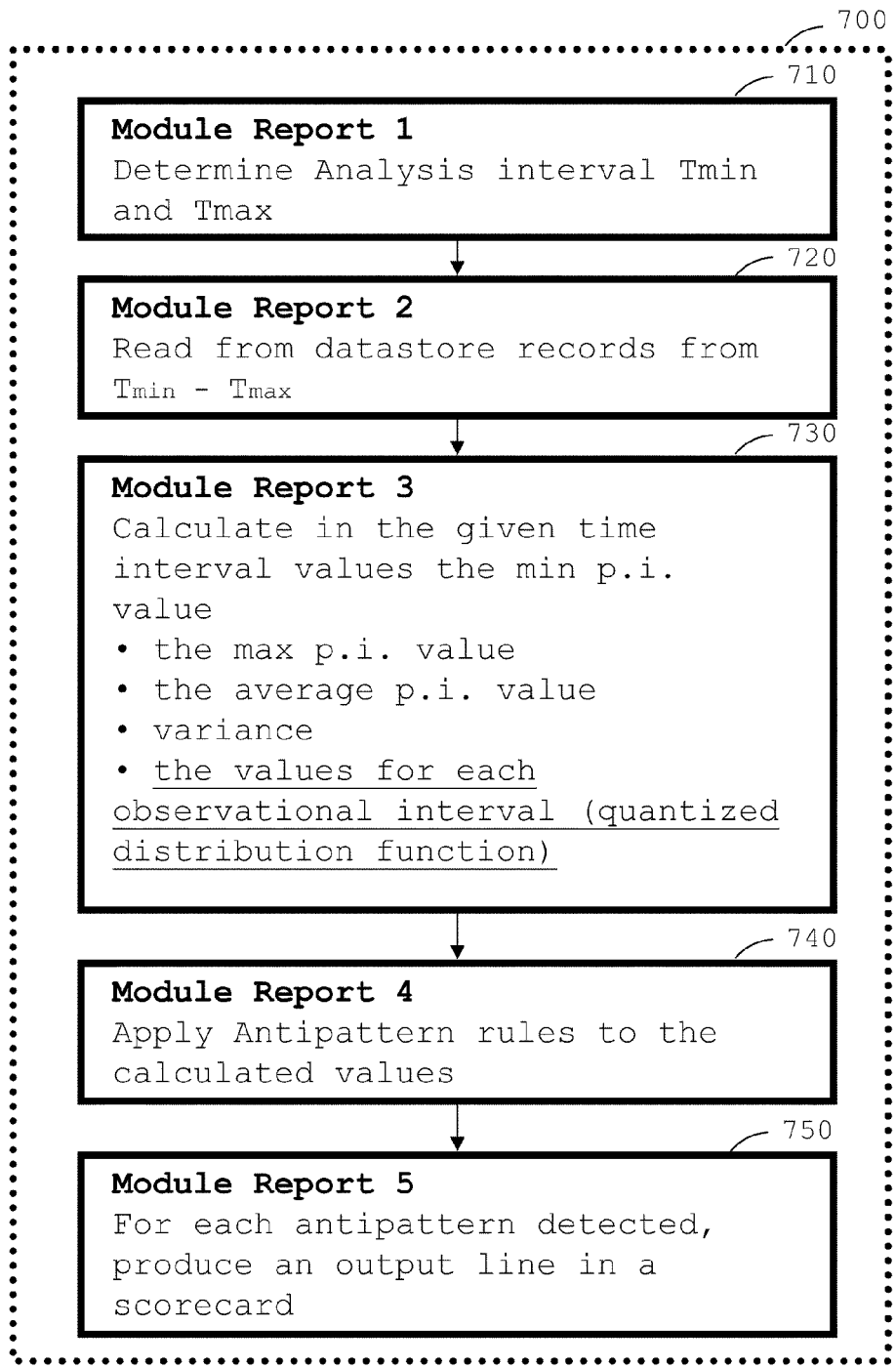
FIG. 7 illustrates the reporting module.

The data reduction engine 600 provides a way to store in an historical database a reduction of the performance indicator such that a reporting module can perform, on a reduced set of historical data, all the analysis explained in FIG. 7. The algorithm reads input data from a file or a database and, based on the information stored in the performance indicator data library table, it processes the detailed performance indicator values and produces a summary record based on grouping criteria such as for example hours, days, cluster of servers, servers type, application instance, middleware instance etc. . . .

According to some embodiments, the reduction is done in two steps:

1) sampling step: the data to be taken as input of the statistical analysis is not the complete population of data; the required input is a meaningful sample of the whole population, of the collection of pieces of data. Existing products and methods do perform the sampling at fixed time intervals; however the regular occurrence of the sample may lead to wrong statistical results because it can fake the representativeness of the sample. According to some embodiments of the invention, there is provided a method in which a random sampling is used. For example, rather than collecting a sample every 10 minutes (600 seconds), the distance between a sample and the following is a random number of seconds between 0 and 1200.

2) data reduction step: according to embodiments of the invention, the reduction of data preserves the characteristics of the distribution of the performance indicator and stores this information into a database. Using the sum of the squares (needed to calculate the Variance or the standard deviation) reveals valuable. In addition, grouping the values in observation intervals enable the use of said values by the reporting module. With this technique, many sampling records can be reduced into a single record by removing useless and redundant information. Other methods may use steps resulting in losses of information, in way that doesn't permit a proper further statistical analysis and which leads to false positives (unduly alerting and diverting the attention of system administrators). According to some embodiments, the reduction of many records into a single one is reached by storing in a database not only the classical statistical functions (Max, Min, Average), but also other values which allow a further processing for calculating variance, standard deviation and distribution function in discrete quantities over a given period.

The algorithm is further detailed below, in a pseudo language. In the example, it is supposed to read from a standard input a stream of homogeneous performance indicators. In the algorithm, date and time inputs are ignored for the sake of clarity.

```
L = select length from Mastercodes,Observational_class where (type(performance
indicator)=Mastercodes.pi_Type) and
Mastercodes.OBJ_CLASS_ID=Observational_class.OBJ_CLASS_ID)
/* the cardinality of the Observational Class in L is stored and it is supposed to be possible
to type the performance indicator with the meta function type*/
// Pi = READ Std input
/* recursively read std input and put the performance indicator values into the Pi until
standard input is empty*/
NumSamples =0
Pi = 0                      /* stores the performance indicator as read from the input */
SUM_Pi = 0                  /* stores the sum of all the performance indicator values) */
SQR_SUM_Pi = 0              /* stores the sum of the squares of all the p.i. values */
MAX_Pi = 0                  /* stores the Maximum value of the performance indicator */
MIN_Pi = 999999             /* stores the Minimum value of the performance indicator */
j = 0                       /* initialize an index*/
while j < L                 /* initialize the OBS Interval Arrays, one to store occurrence one to
                               store intervals' upper bound */
    do
        OBS_Interval_Array_Occurences[j]=0
        OBS_Interval_Array_point[j]= select Obs_Interval[j] from Mastercodes
        j++
    end while
OBS_Interval_Array_Occurences[L]=0
DO_UNTIL <grouping criteria> /*increase Calculate properly statistic functions*/
    NumSamples++
    SUM_Pi = SUM_Pi + Pi
    SQR_SUM_Pi = SQR_SUM_Pi + Pi*Pi
    If Pi > MAX_Pi then MAX_Pi = CPU_Perc
    If Pi < MIN_Pi then MIN_Pi = CPU_Perc
    /*increase occurrence ranking in the belonging interval*/
    if Pi > OBS_Interval_Array_point[L] then
        do
            OBS_Interval_Array_Occurences[L]++
        else
            j = 0
            while j < L
                do
                    if (j = 0 and Pi between [0.0, OBS_Interval_Array_point[j]]) then
                        do
                            OBS_Interval_Array_Occurences[j]++
                        end if
                    if Pi between [OBS_Interval_Array_point[j],
                       OBS_Interval_Array_point[j+1]]
                        do
                            OBS_Interval_Array_Occurences[j]++
                        end if
                    j++
                end while
        end if
    end do until
WRITE in the historical DB a record with the following fields
    NumSamples
    SUM_Pi
    SQR_SUM_Pi
    MAX_Pi
    MIN_Pi
    OBS_Interval_Array_Occurences
REPEAT from // the beginning until there are input records
```

FIG. 7 illustrates the reporting module.

The FIG. 7 shows a report module 700, which comprises five submodules 710, 720, 730, 740 and 750.

In Module Report 1 (710), based on user input, the interval time analysis is determined. The choice of an analysis interval i.e. Tmin, Tmax is a critical step according to some embodiments of the invention. The overall statistical distribution usually changes dramatically depending on it. For example, considering a Bank which has a typical online workload during the following service hour 8:00-13:00, 14:00-18:00: during this period, the workload (mostly online) is completely different than the workload during the other hours (mostly batch processing tasks). In this example, it is worth to analyze the data of the two periods separately and in the end to define and calculate two separate distribution functions.

A possible method to determine this interval is achieved by using business information, i.e. information known by the system administrator: when a specific application is going to be used, a specific time of the day, in specific days of the week, month or year, etc; this information relates to a certain number of reasons: closing of a quarter revenue, sportive events, holidays, etc. If no such information is available, in order to build a fully automated statistical system, it is required to use a filter to analyze data and extrapolate intervals. No such filter being available in the prior art, one has been developed and implemented using the following rules/assumptions:

the observation time set does not need to be a continuous time interval (it may be a set of non contiguous hours during the day, i.e. for example 9.00-11.00 a.m.+2.00-6.00 p.m.);

the observation time set would be compound by hours;

the filter may include or exclude an hour in the observation time set based on simple statistical properties (i.e. only hours where the average CPU is above 5%) in order to keep the computational effort as small as possible.

The Module Report 2 (720), given this time interval, then collects all relevant data records on datastore and passes this input to the Module Report 3 (730) which calculates for each managed object's performance indicator the summarized functions on all the analysis time interval i.e. min, max, average, variance and the values for each observational interval (quantized distribution function) of the performance indicator values resulting in the analysis interval. The set of records produced is called for simplicity summarized function records. The Module Report 4 (740) runs all applicable antipattern rules on summarized function records. All detected antipatterns for each managed objects is recorded and weighed.

In the end, the Module Report 5 (750) builds a scorecard, wherein for each managed object, there are listed the performance indicators which have some detected antipatterns (with corresponding weighs). The weigh or ponderation applied to a particular antipattern is determined:

quantitatively: from how much a given antipattern applies to a performance indicator: for example, if the accumulation point over a threshold is either 15% or 40% of the samples, this will determine different weighs.

qualitatively: considering the business importance of such an object (i.e determine if the application is business-critical) or how much the performance indicator is considered meaningful for the analyzer.

The quantitative aspect of the weigh is thus associated with the antipattern rule (is part of the definition of the Antipattern) while the qualitative aspect of the weigh is adjusted by the analyzer.

When the historical database is populated the following statistical functions can then be calculated (since the historical database contains only a small number of records the computational cost of these functions is not high. The functions are expressed using a pseudo SQL to access the historical database):

Average=$\mu$=SELECT(SUM(SUM_Pi)/SUM(NUMSamples)) WHERE <filtering conditions>
Variance=$\sigma^2$=SELECT(SUM(SQR_SUM_Pi)/SUM(NUMSamples))-(SUM(SUM_Pi)/SUM(NUMSamples))$^2$ WHERE <filtering conditions>
Standard deviation=$\sigma$
Dispersion Index=$(\mu-\sigma)/\mu$
Max=SELECT MAX(MAX_Pi) WHERE <filtering conditions>
Min=SELECT MIN(MIN_Pi) WHERE <filtering conditions>
Quantized Distribution Function
For the $j^{th}$ interval $I_j$=SELECT sum(OBS_Interval_Array_Occurences(j-1)/SUM(NUMSamples) WHERE <filtering conditions>

In conclusion, there is disclosed a method of monitoring an infrastructure comprising managed units, the method comprising the steps of: acquiring data associated with a first performance indicator from a first managed unit; determining a first quantized distribution function of at least a subset of pieces of data of the acquired data of the first managed unit; determining if the first quantized distribution function verifies one or a plurality of predefined rules describing particular distribution functions of performance indicators. In particular, there is acquired data from the first managed unit; there is reduced the amount of the acquired data into at least a subset of data by using a random sampling or by grouping data; there is determined if the first quantized distribution function matches one or a plurality of predefined rules is performed on predefined quantization intervals. The acquired data is acquired from sources such as a third party's application, a local monitoring platform or local system's logs. The data comprises values related to the first performance indicator, timestamping information and a label to identify said first performance indicator. After the matching step, there is determined a score for the first managed unit associated with said first performance indicator. There is performed a ranking of a plurality of managed units whose scores have been determined, said ranking being obtained by weighing associated scores of said managed units. There is provided a computer program, a computer readable medium and a system comprising means adapted to carry out the steps of the method.

Prolog is registered trademark of Meridian Systems, Inc. in the United States and other countries. Other company, product or service names may be the trademarks or service marks of others.

The invention claimed is:

1. A computer program product for monitoring an infrastructure comprising a plurality of managed units the computer program product comprising:
a non-transitory computer readable storage medium having computer readable program code embodied therewith, the computer readable program code comprising:
computer readable program code for acquiring from a logical grouping of software and infrastructure components, data that is associated with a performance indicator of a managed unit;
computer readable program code for reducing an amount of the acquired data into a subset of the acquired data;
computer readable program code for determining a quantized distribution function of at least a subset of the acquired data for a given performance indicator by computing at least one statistical descriptor selected from the group consisting of min, max, average and sums of squares of data;
computer readable program code for checking if one or more anti-pattern rules apply to the quantized distribution function in order to determine if one or more anti-patterns can be detected, the anti-patterns comprising a particular distribution of values of one or more performance indicators that have been found in systems already determined not to be performing well;

computer readable program code for scoring the performance indicator of the managed unit based upon the checking if one or more of the anti-pattern rules apply to the quantized distribution function; and, computer readable program code for repeating the acquiring, reducing, determining, checking and scoring for other performance indicators in the managed unit and then repeating the acquiring, reducing, determining, checking and scoring for one or more performance indicators of one other managed unit.

2. The computer program product of claim 1, wherein the acquired data is reduced into a subset of the acquired data by using a random sampling or by grouping data.

3. The computer program product of claim 1, wherein the step of determining if said calculated distribution matches an anti-pattern associated with the performance indicator is performed on predefined intervals.

4. The computer program product of claim 1, wherein the acquired data is acquired from sources such as a third party's application, a local monitoring platform or local system's logs.

5. The computer program product of claim 1, wherein said acquired data comprises values related to the performance indicator, timestamping information and a label to identify said performance indicator.

6. The computer program product of claim 1, further comprising determining a score for the logical grouping of software and infrastructure components associated with said performance indicator.

7. The computer program product of claim 6, further comprising the step of ranking a plurality of logical groupings of software and infrastructure components whose scores have been determined, said ranking being obtained by weighing associated scores of said logical groupings of software and infrastructure components.

8. The computer program product of claim 1, wherein the frequency distribution is calculated using an averaging function.

9. The computer program product of claim 1, wherein the frequency distribution is calculated using a normalization algorithm.

10. The computer program product of claim 1, wherein the frequency distribution is calculated using a mobile mean algorithm.

11. A computer program product for use with a computer equipment infrastructure including a managing unit and a plurality of logical groupings of software and infrastructure components, the computer program product comprising:

a non-transitory computer readable storage medium having computer readable program code embodied therewith, the computer readable program code comprising:

computer readable program code for, for each given logical grouping of the plurality of logical groupings, acquiring, by the managing unit, over a communication network and from the given logical grouping, performance data including information indicative of performance of the given logical grouping with respect to a first performance parameter;

computer readable program code for, for each given logical grouping of the plurality of logical groupings, determining, by the managing unit, a quantized distribution function of the first performance parameter for the given logical grouping based, at least in part upon at least a portion of the performance data corresponding to the given logical grouping by computing at least one statistical descriptor selected from the group consisting of min, max, average and sums of squares of data;

computer readable program code for, for each given logical grouping of the plurality of logical groupings, determining, by machine logic rules of the managing unit, that a subset of anti-pattern rule(s) of a plurality of ant-pattern rules pertaining to a particular distribution of values of one or more performance indicators, which particular distributions are found in systems determined not to be performing well, applies to the quantized distribution function for the given logical grouping in order to determine if one or more anti-patterns can be detected, the anti-patterns comprising a particular distribution of values of one or more performance indicators that have been found in systems already determined not to be performing well; and computer readable program code for, for each given logical grouping of the plurality of logical groupings, determining, by the managing unit, a first performance value with respect to the first performance parameter for the given logical grouping based, at least in part, the applicable subset of anti-pattern rule(s) for the given logical grouping.

* * * * *